US007930286B2

(12) United States Patent
Sue (10) Patent No.: US 7,930,286 B2
(45) Date of Patent: Apr. 19, 2011

(54) FEDERATED SEARCHES IMPLEMENTED ACROSS MULTIPLE SEARCH ENGINES (75) Inventor: Ryan Sue, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 284 days.

(21) Appl. No.: 11/707,684

(22) Filed: Feb. 16, 2007

(65) Prior Publication Data
US 2008/0201304 A1     Aug. 21, 2008

(51) Int. Cl.
G06F 7/00 (2006.01)
(52) U.S. Cl. ......... 707/706; 707/707; 707/722; 707/723
(58) Field of Classification Search .............. 707/3, 706, 707/707, 722, 723
See application file for complete search history.

(56) References Cited

U.S. PATENT DOCUMENTS

| 6,944,612 | B2 * | 9/2005 | Roustant et al. | 707/706 |
|---|---|---|---|---|
| 7,308,643 | B1 | 12/2007 | Zhu et al. | |
| 7,440,968 | B1 | 10/2008 | Oztekin et al. | |
| 2002/0069194 | A1 * | 6/2002 | Robbins | 707/3 |
| 2004/0068486 | A1 | 4/2004 | Chidlovski | |
| 2005/0192946 | A1 * | 9/2005 | Lu et al. | 707/3 |
| 2006/0041562 | A1 * | 2/2006 | Paczkowski et al. | 707/10 |
| 2006/0288001 | A1 | 12/2006 | Costa et al. | |
| 2007/0038601 | A1 * | 2/2007 | Guha | 707/3 |
| 2007/0038614 | A1 * | 2/2007 | Guha | 707/4 |
| 2007/0192300 | A1 * | 8/2007 | Reuther et al. | 707/3 |

FOREIGN PATENT DOCUMENTS
EP  1 736 902 A1  12/2006
WO  WO 2007/098008 A2  8/2007

OTHER PUBLICATIONS

Notification of Transmittal of the International Search Report and the Written Opinion of the International Searching Authority, or the Declaration received in International application No. PCT/IB2008/00278 dated Aug. 26, 2009 (11 pages).
Current claims of International application No. PCT/IB2008/00278, Oct. 2009 (3 pages).
Australian Office Action received in Application No. 2008327678 dated Nov. 10, 2010 (2 pages).
Current Claims of Australian Application No. 2008327678 dated Nov. 2010 (4 pages).

* cited by examiner

Primary Examiner — Etienne P LeRoux
Assistant Examiner — Cindy Nguyen
(74) Attorney, Agent, or Firm — Hickman Palermo Truong & Becker LLP (57) ABSTRACT A plurality of search engines is selected from multiple search engines based on a search query and one or more criteria. To obtain search results for the search query, one or more search queries are submitted to the plurality of search engines. For each search engine of the plurality of search engines, certain search results are received for the one or more search queries submitted to each search engine. Consolidated search results are generated with consolidation of the certain search results that are received from each search engine of the plurality of search engines.

23 Claims, 8 Drawing Sheets

Example Process 100

Search results consolidated across relevant search engines (standard view)

FEDERATED SEARCHES IMPLEMENTED ACROSS MULTIPLE SEARCH ENGINES

TECHNOLOGY

The present invention relates generally to information retrieval, and more specifically, to federated searches implemented across multiple search engines.

BACKGROUND

Standard web and internet searches typically cover a small portion, perhaps only about ten percent, of the information that is accessible via the web. There are various reasons for this limitation. One reason relates to scalability. For instance, significant costs, effort and infrastructure are associated with storing and indexing data, keeping information fresh and accessibly available. For information that is accessed relatively rarely, the costs may seem excessive in relation to the apparent demand, usefulness, etc. of the information. Doing this for all information that may be accessible via the web could be cost prohibitive.

Second, standard web based search engines are deterred from accessing much information on the web because standard web crawlers, which help to build the indexes used by the search engines for searching, may lack ability to get at that information. For example, a web crawler may not be able to access a database or a website that requires positive access enablement, such as password authentication or other security measures.

Finally, standard web search is designed for breadth and popularity, spanning the upper stratum of more popular information. While designed, in a sense, to return search results that may most probably please the most users, most of the time, many standard web search results may lack relevance for significant numbers of users.

To seek more relevant search results, vertical searching may be used, which is more specific than standard web search, being oriented more for specific domains and topics. However, users of vertical searching configure their systems for each search engine, more or less individually. With a relatively small selection of search engines, this practice may be more or less manageable. However, with many vertical search engines, it may soon become inefficient and expensive.

Based on the foregoing, it would be useful to perform vertical searches more effectively.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3B, 3C and 3D depict example screenshots, according to an embodiment of the present invention;

DESCRIPTION OF EXAMPLE EMBODIMENTS

Example embodiments relating to federated searches implemented across multiple search engines are described herein. In the following description, for the purposes of explanation, numerous specific details are set forth in order to provide a thorough understanding of the present invention. It will be apparent, however, that the present invention may be practiced without these specific details. In other instances, well-known structures and devices are referred to without exhaustive treatment, in order to avoid unnecessarily obscuring the present invention.

Overview

According to an embodiment, a set of vertical search engines is selected based on a search query. The vertical search engines that are more likely to provide search results more relevant to a query are selected for the set. For example, a query may request "pork recipe". Based on the inclusion of these search terms in the query, vertical search engines for recipes are selected.

Multiple search engines are thus accessed in performing vertical searches with less user configuration for execution of queries therewith. Further, efficient and cost effective vertical search queries are executed across multiple specialized search engines and executed selectively.

For each selected search engine to which a search query is submitted, search results are received. Consolidated search results are generated with consolidation of the certain search results that are received from each search engine of the plurality of search engines.

In an embodiment, the consolidation of results from queries spanning multiple search engines can be varied, depending upon the preferences of a vertical search user. For instance, a user may prefer being presented with a single list of the combined search results from the multiple search engines. This presents to end users results that are deemed most relevant by the search engine system executing the queries. A user may prefer, in addition or in the alternative thereto, to be presented with results from each search engine of a selection of search engines. In this case, the user is presented results from search engines that are deemed by the search engine system to be the most relevant search engines. Vertical search users intent upon issuing additional queries, which are to be limited to a specific domain, may thus be presented results that are likely to be relevant. Embodiments described herein thus implement federated search across multiple search engines and present search users with relevant search results as well as relevant search engines for further, more domain specific search.

Notation and Nomenclature

Some of the terms and phrases used herein have meanings as described in this section, unless specifically stated otherwise.

A search engine is software (executable instructions and data) configured for searching a set of information resources. A computer executing a search engine generates search results for search queries submitted to the search engine.

Search engines often run on servers, referred to herein as search engine servers. A server is a combination of integrated software components (including data) and an allocation of computational resources, such as memory, a node, and processes on a computer for executing the integrated software components, where the combination of the software and computational resources are dedicated to a particular function. In the case of a search engine server, the server is dedicated to searching for a set of information resources.

Search engines are widely used on the Internet, the World Wide Web (www, Web, WWW, etc.) and other large internetworks and information resource webs. Often, search engines are publicly accessible on servers as web sites, such as those made available with Yahoo™ and Google™ web pages, which are respectively accessible with the links (http://search.yahoo.com/) and (http://www.google.com/).

The set of information resources searched by search engines are referred to herein as documents. A document is any unit of information that may be indexed by search engine indexes. Search engine indexes are described below. Often a document is a file which may contain plain or formatted text, inline graphics, and other multimedia data, and hyperlinks to other documents. Documents may be static or dynamically generated.

Search engines use a search engine index (i.e., one or more), also referred to herein simply as an index, to search for information. Search engine indexes can be directories, in which content is indexed more or less manually, to reflect human observation. More typically, search engine indexes are created and maintained automatically by processes referred to herein as crawlers. Crawlers explore information over the Internet, essentially continuously, looking for as many documents as they may find at locations to which the crawlers are configured to search. Crawlers may follow links from one document to another. A crawler may retrieve (e.g., fetch, download) a web resource (e.g., a page), save an original form of the page or other resource, identify and extract links to other resources, pages, etc. This allows these resources/pages to be subsequently retrieved, as well. Upon retrieving a crawled page or other resource, other forms of information may be extracted from the crawled resources/pages.

The content extracted from the resources/pages retrieved with the crawler may then be indexed. The content of the resources/pages may be indexed (e.g., semantically, conceptually, etc.) in a search index and summarized in databases, typically of significant size. It is these indexes and databases that are actually searched in response to a search query. Thus generally, crawlers acquire content, which is consumed with an indexing process to build indexes.

In one configuration the software for a search engine may be configured to search one set of resources and in another configuration be configured to search another set of resources. Each such configuration is considered to be a different search engine.

Vertical search engines are engines that use indexes that index documents that are limited to a particular domain or particular topic. Vertical search engines may be limited in this way by, for example, configuring a crawler to search specific locations. For example, a crawler for a vertical search engine for recipes may be configured to search sites and/or locations known to hold recipe documents.

The search result generated by a search engine comprises a list of documents and may contain summary information about the document. The list of documents may be ordered. To order a list of documents, a search engine may assign a rank to each document in the list. When the list is ordered by rank, a document with a relatively higher rank may be placed closer to the head of the list than a document with a relatively lower rank. A search engine may rank the documents according to relevance to the search query. Relevance is a measure of how closely the subject matter of a document matches search query terms.

Illustrative Embodiment

Figure 1:
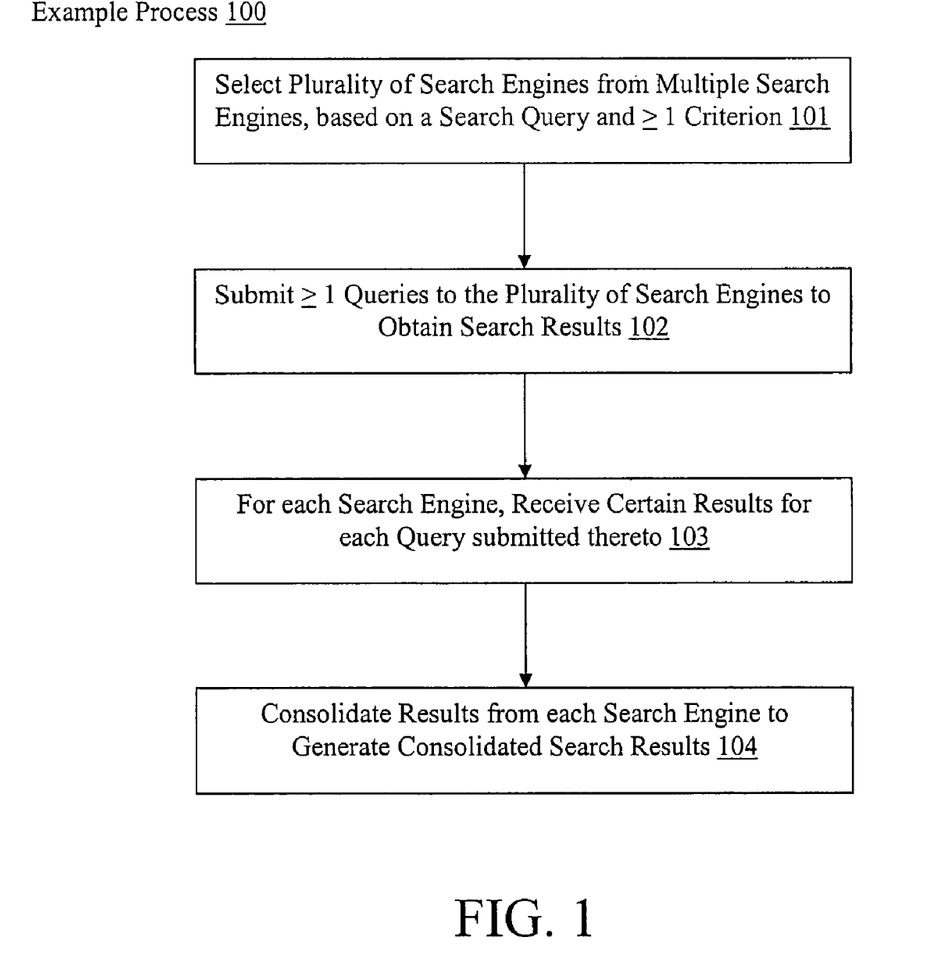
FIG. 1 depicts an example process, according to an embodiment of the present invention.

FIG. 1 depicts an example process 100, according to an embodiment. Process 100 begins with selecting a plurality of search engines from multiple search engines, based on a search query and at least one criterion. One or more search queries are submitted 102 to the plurality of search engines to obtain search results. For each search engine, certain search results are received 103 for each query submitted to each search engine. These results, from each of the search engines, is consolidated 104 to generate consolidated search results.

Figure 2:
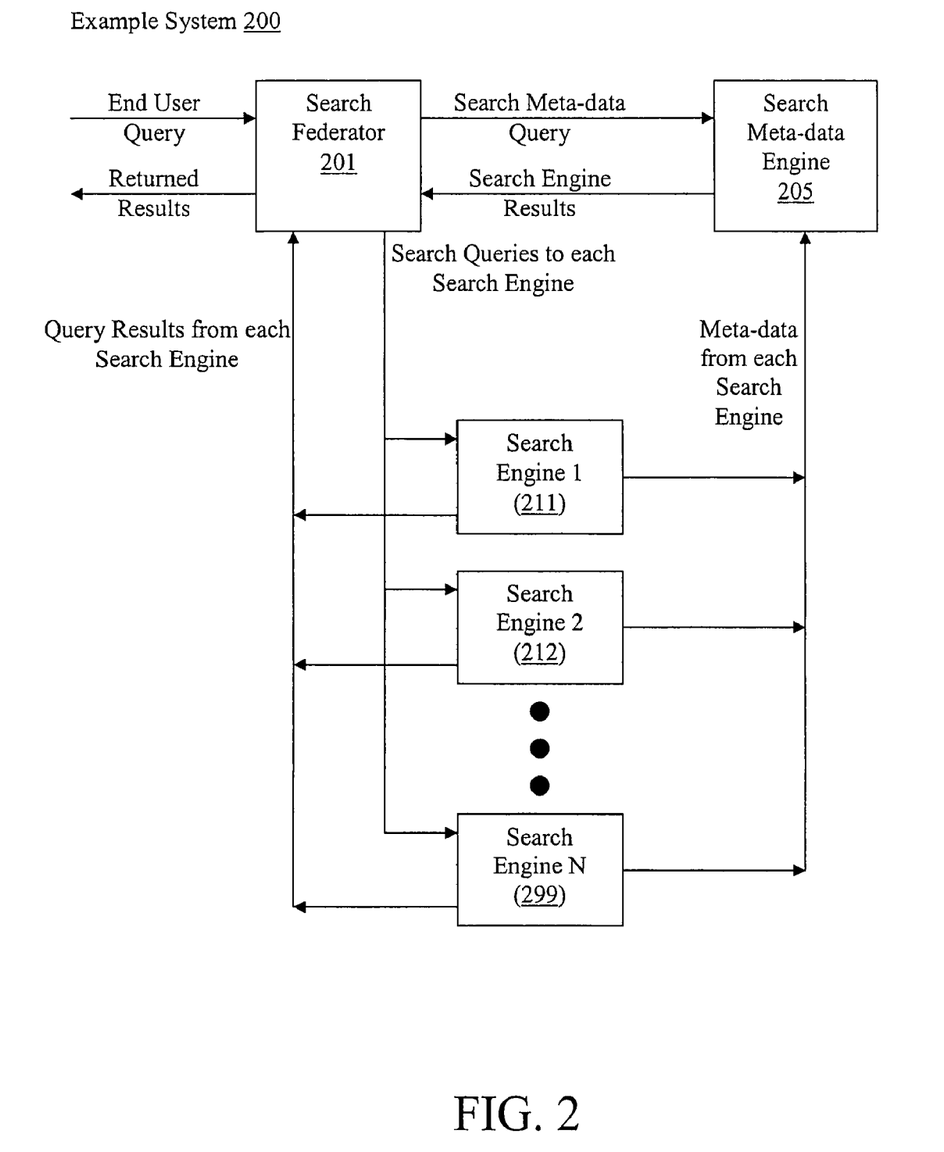
FIG. 2 depicts an example system, according to an embodiment of the present invention.

FIG. 2 depicts an example system 200, according to an embodiment. Search federator 201 receives a user query. A federator, such as federator 201, comprises one or more computer processes that execute software, in which the software causes the computer process to receive a search query, select one or more search engines based on the search query, and transmit the search query to the selected search engines. The federator may also consolidate the results, which are returned from multiple search engines in response to the search query. A federator may be an integrated component of a search engine, in which the one or more processes allocated to the search engine also execute the federator.

To select search engines to which to submit search queries, federator 201 needs information that can be used to make the selection. In an embodiment, federator 201 obtains such information by submitting a search meta-data query to a search meta-data engine 205.

A search meta-data engine is a search engine where the set of information resources is information about other search engines. This information includes search engine meta-data, which is information that describes search engines and/or search engine indexes. The metadata may include descriptors of topics relevant to a search engine and key words associated with the relevant topics. The results returned identify one or more search engines, for example, a web site, and/or the identity of a search engine index.

The query submitted to search engine meta-data 205 is referred to herein as a search meta-data query. In an embodiment, the search meta-data query is generated based upon a user's query, including terms in the user query. In an implementation, a transformation process essentially transforms the user query into another query that is appropriate for querying the other search engines. The results returned by search engine meta-data 205 may be ranked based on the relevance to the user query.

Based on the results returned from search engine meta-data 205, federator 201 selects from among multiple search engines 211 and 212-299 the search engines to which to issue the search queries and then issues the queries to the selected search engines. The selection may be a selection of a particular search engine server, such as a search engine hosted by a search engine server (e.g. web site), or may be a search engine index. In the case of the latter, federator 201 submits a query to a selected search engine by submitting the query to a search engine configured for the search index.

Search results are then returned from each of the selected search engines. The results returned are then consolidated and ranked by federator 201. The ranking can be based on a variety of techniques, for instance, using frequencies of document identifiers such as uniform resource locators (URL). Further, in an embodiment, ranks are calculated for each search engine; the ranks are used to determine how to consolidate the search results from all the selected search engines. Search engine ranks may be calculated according to a method described in co-pending U.S. patent application, Ser. No. 11/707,733 by Ryan Sue, entitled "Ranking Documents," which was filed on Feb. 16, 2007 and assigned to the Assignee of the present Application, which is incorporated by reference in its entirety as if fully set forth herein. In an implementation, search engine ranks are calculated as described with reference to FIG. 5, below.

In an embodiment, performance overhead or other costs that may be associated with use of search meta-data engine 205 can be avoided by simply not using it. Instead, a search query is simply submitted to all of a set of multiple search engines. However, the performance savings realized by this measure also have the additional cost of having to execute the end user query against all of the multiple search engines, in which some of the multiple search engines may return content or other results that lack relevance to the end user's query.

Example Search Results Presentation

Where the search federator 201 issues a search meta-data query for "chicken" to search meta-data engine 205, the search meta-data engine 205 returns search engine results that identify search engines relevant to an end user query for "chicken."

Search federator 201 issues the "chicken" query over the relevant search engines returned by meta-data engine 205. The search results returned from the relevant search engines "1" and "2" are consolidated into a set of search results for presentation to the end user. The search results, consolidated from all relevant search engines, may be presented to the end user in one or more of several ways.

Figure 3A:
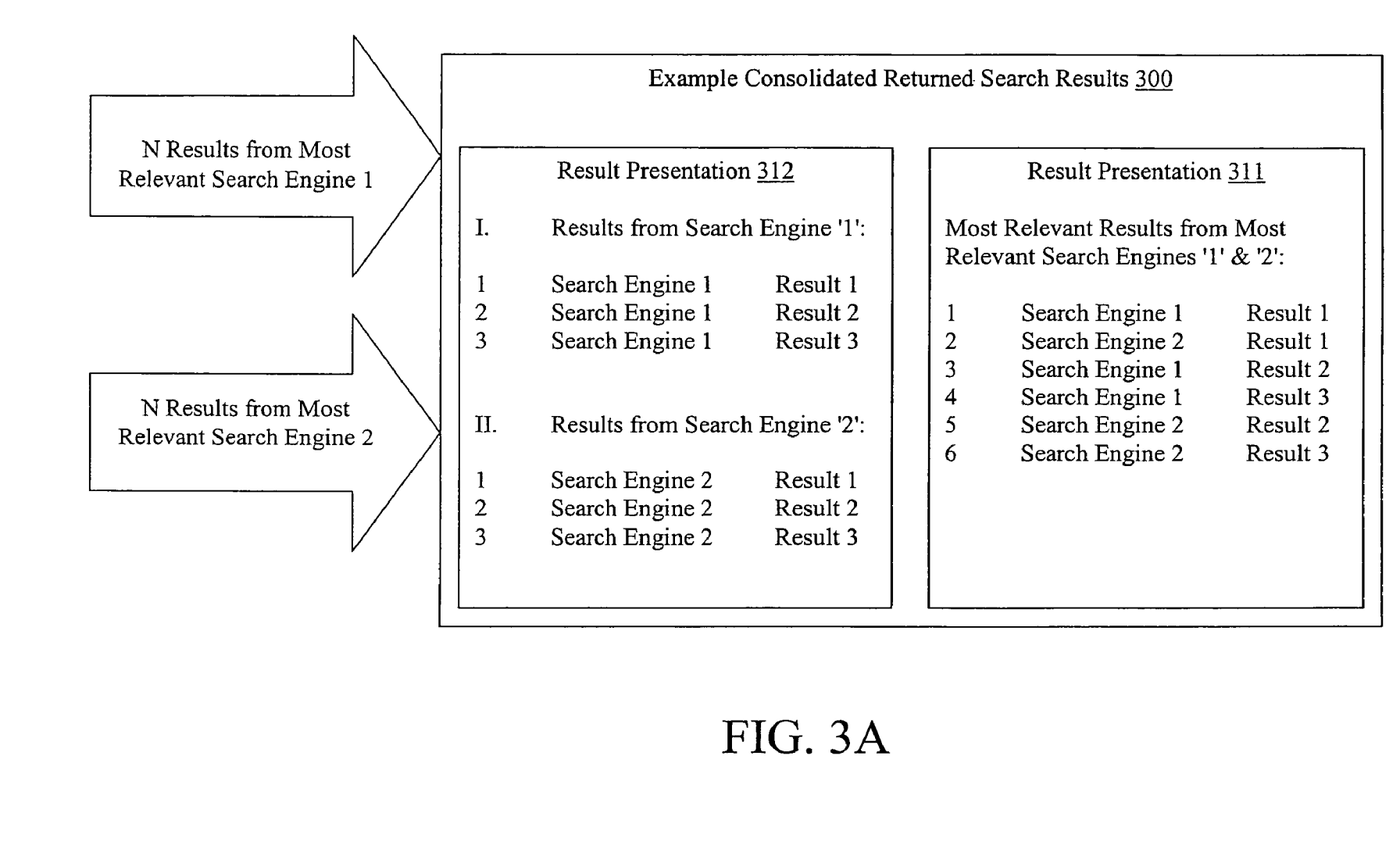
FIG. 3A depicts example search result presentations, according to an embodiment of the present invention.

FIG. 3A depicts an example of returned search results 300, according to an embodiment. Responsive to a user preference, result presentation 311, result presentation 312 or both may be presented to the user upon execution of the user's query according to an embodiment. A number (e.g., ten) of results are returned in response to the user's query by the relevant search engines "1" and "2." It should be appreciated that another number of search engines may be relevant and that any number of results may be returned.

Result presentation 311 presents, as a single list, the intermixed results from multiple search engines ranked according to relevance to the user's query. Thus, an embodiment presents to the user results deemed most relevant with the system 200 (FIG. 2). Result presentation 312 presents results grouped by each of a selection of the multiple search engines. In this format, a user may be better able to visually observe and identify which search engine provides the most relevant results to the query or the user's desire.

FIG. 3B depicts an example screenshot of search results 311B, which are consolidated across relevant search engines. In an implementation, search results that are consolidated across relevant search engines may comprise a more or less "standard" view of the results, which may be changed according to a user's preference.

Figure 3C:
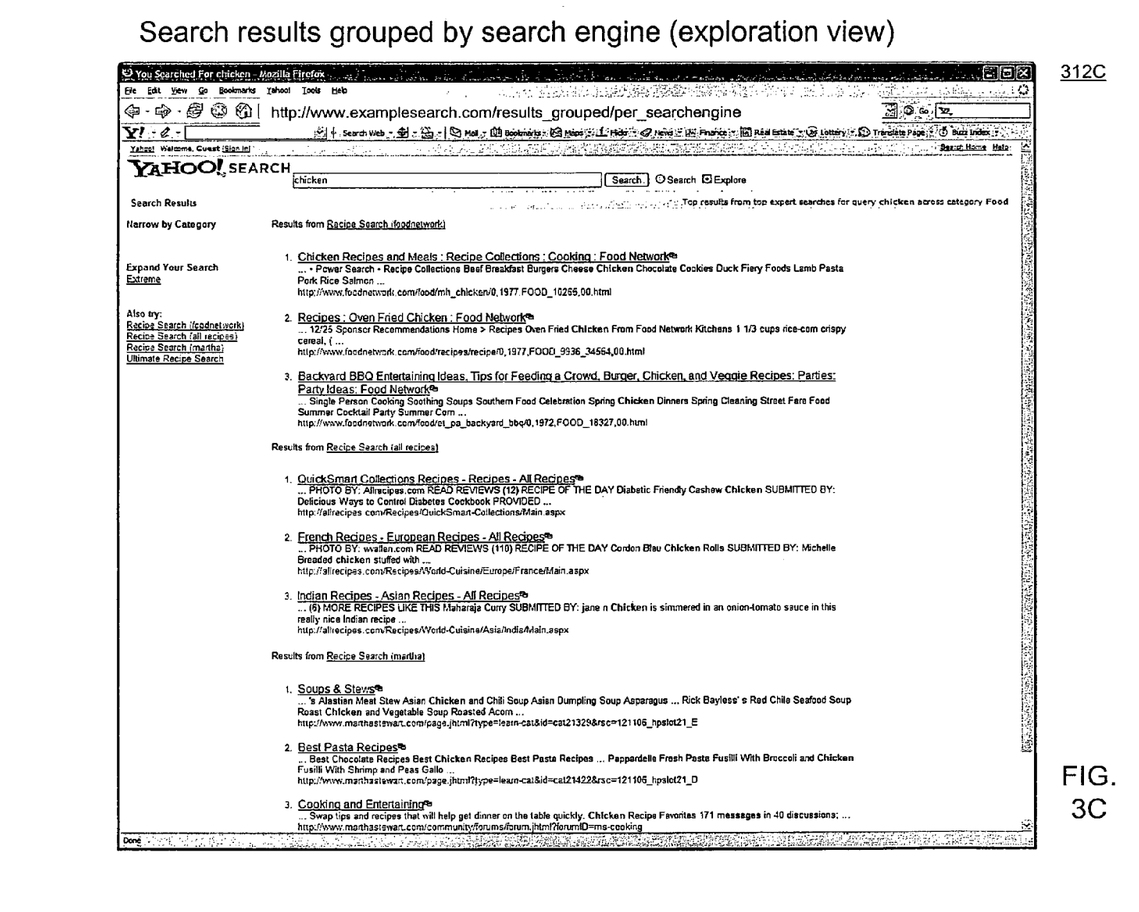

FIG. 3C depicts an example screenshot of search results 312C, which are grouped according to which search engine returned each collection of search results. In an implementation, search results that are grouped according to which search engine returned each collection of search results may comprise a more or less exploratory, e.g., "exploration" view of the results, which may be changed according to a user's preference.

Figure 3D:
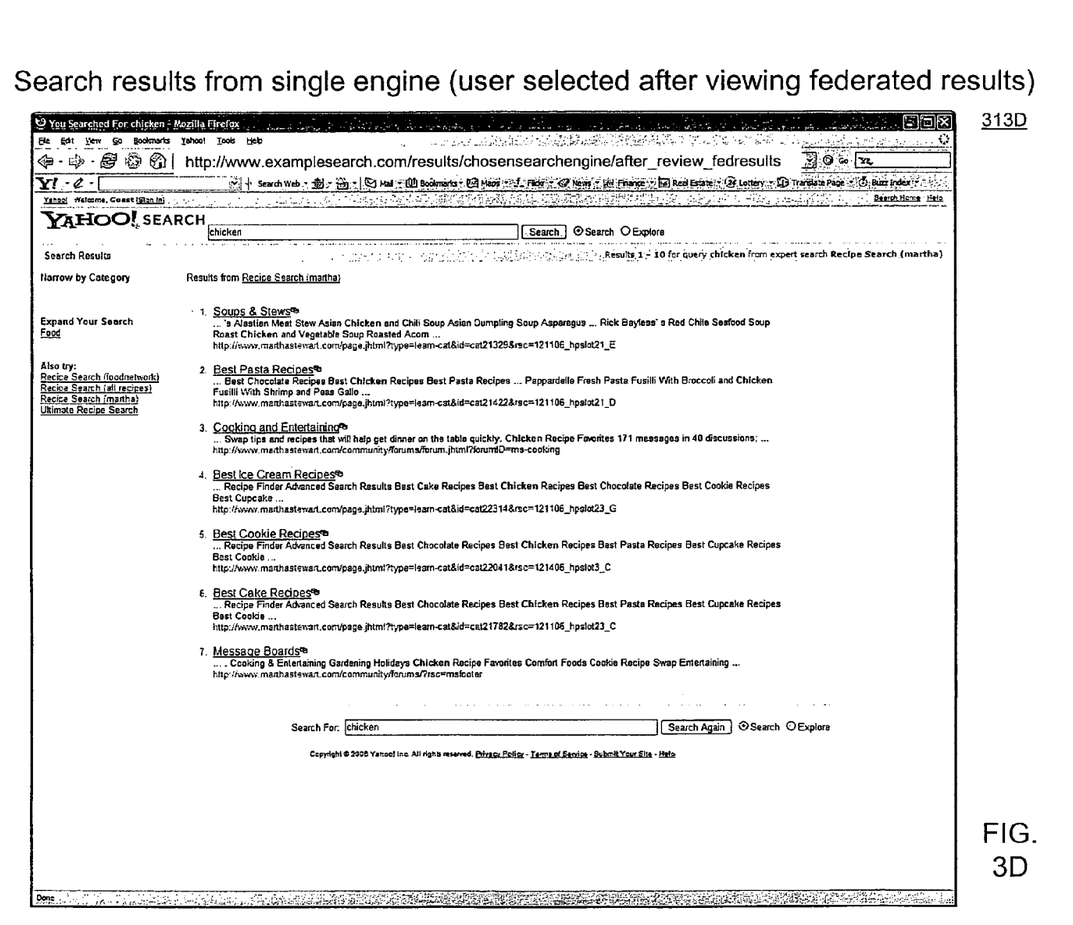

FIG. 3D depicts an example screenshot of search results 313D, which include results from a single search engine, such as may be selected, designated, etc. by a user, for instance, after consideration of one or more of an exploration screenshot (e.g., search results 312C; FIG. 3C), a single list of consolidated results (e.g., search results 311B; FIG. 3B) or both. In an implementation, search results may be sought from a single search engine upon a user discovering (e.g., from previous performance and/or consideration of other search result groupings) that a particular search engine returns most relevant results (e.g., from that user's perspective). The search engine selected to present results is changeable according to a user's preference.

Example Hardware Overview

Figure 4:
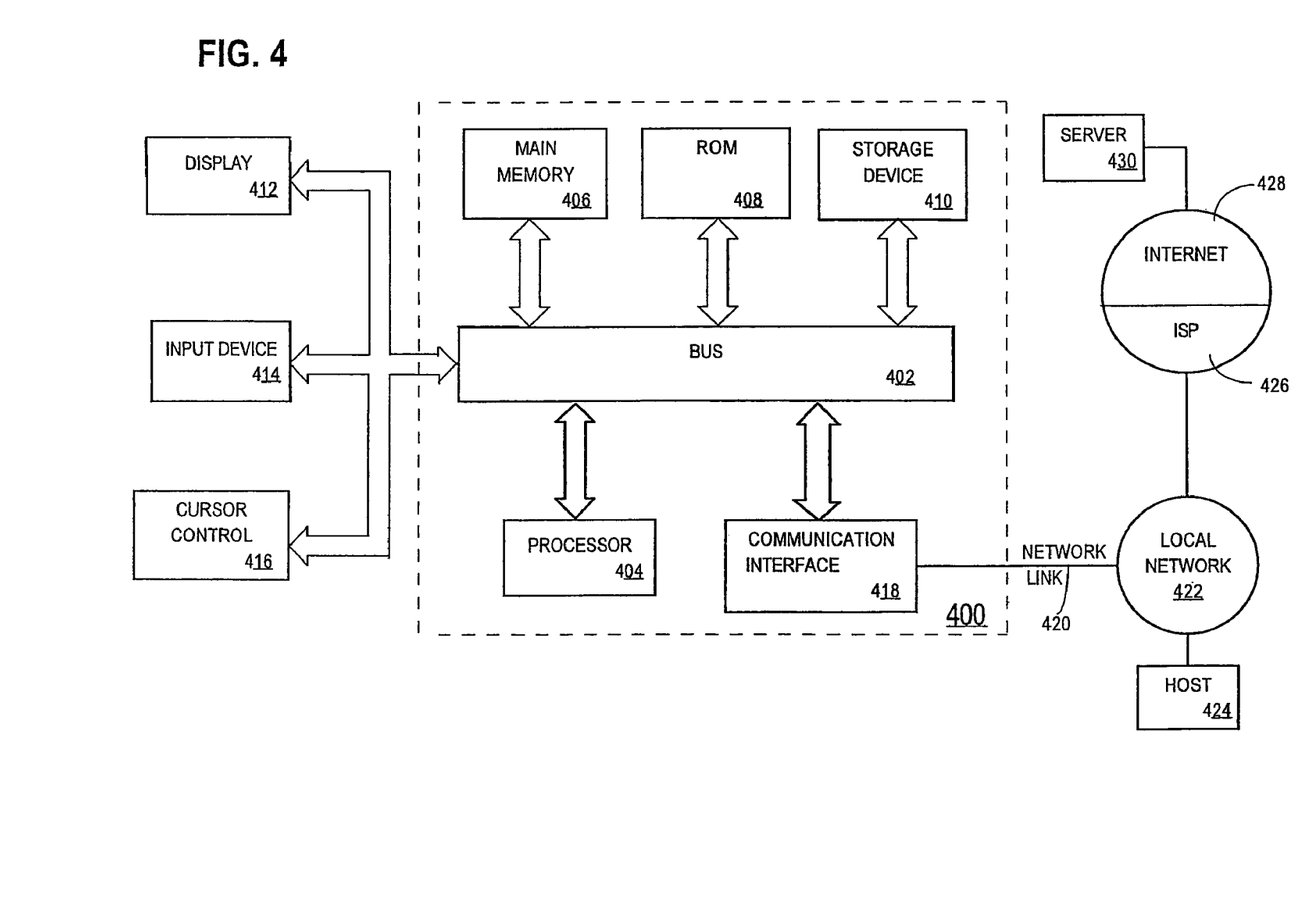
FIG. 4 depicts an example computer platform upon which an embodiment of the present invention may be practiced.

FIG. 4 depicts an example computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), a cathode ray tube (CRT) or the like, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Example embodiments of the invention relate to the use of computer system 400 for replicating changes, made to data blocks at a source database system, to replicas of the data blocks at the standby database system. According to one embodiment of the invention, replicating changes, made to data blocks at a source database system, to replicas of the data blocks at the standby database system is provided by one or more instances of computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes and other computer-readable media, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card a cable or digital subscriber line (DSL) modem or another modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for replicating changes, made to data blocks at a source database system, to replicas of the data blocks at the standby database system, as described herein.

The received code may be executed by processor 404 as it is received, and/or stored in storage device 410, or other non-volatile storage for later execution. In this manner, computer system 400 may obtain application code in the form of a carrier wave.

Example Consolidation of Results from Multiple Search Engines

Figure 5:
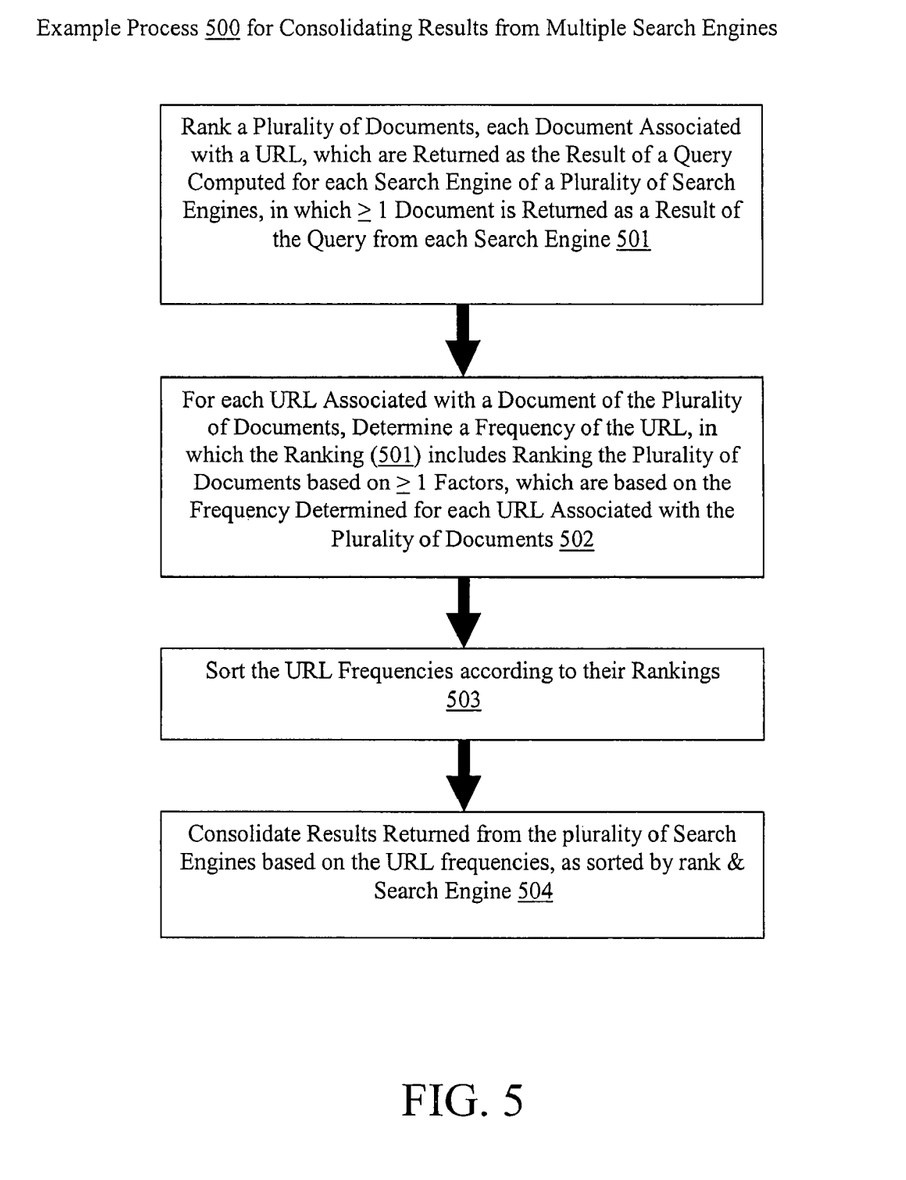
FIG. 5 depicts an example process for consolidating results from multiple search engines, according to an embodiment.

FIG. 5 depicts an example process 500 for consolidating results from multiple search engines, according to an embodiment. Process 500 begins with ranking 501 a plurality of documents, each of which is associated with a Uniform Resource Locator (URL). The documents are returned as the result of a query that is computed by each search engine of a plurality of search engines. At least one of the documents of the plurality of documents is returned as a result of the query from each search engine.

For each URL associated with a document of the plurality of documents, a frequency of the URL is determined 502. The ranking described above (block 501) includes ranking the plurality of documents based on one or more factors. These factors are based on the frequency determined for each URL associated with the plurality of documents.

In an embodiment, the frequency $f_{url}(u_i, S)$ of each URL 'u' associated with a document 'i' of a plurality of documents that are returned in response to a query executed over a plurality (e.g., set) of search engines 'S' is calculated to make the URL frequency determination 502. In an embodiment, the frequency of a URL is calculated according to Equation 1, below:

$$f_{url}(u_i, S) = |s_i \supset u_i|/|S| \qquad \text{(Equation 1)}$$

in which $f_{url}$ is the URL frequency, $|S|$ is the total number of search engines over which the query is executed and $|(s_i \supset u_i)|$ is the total number of search engines, which return results that contain the URL, $u_i$.

In an embodiment, the ranking of a document is measured according to its rarity (e.g., relative to the frequency of other URLs) across a set of search engine results. The rarity of a document in the search results returned from the search engines effectively comprises a metric of how interesting that document is. The ranking of the document thus corresponds in an embodiment with an inverted URL frequency. Searches performed according to such an embodiment may thus return documents that are more highly specialized, obscure, which are usually ignored by other search engines. The results of such searches are thus likely to return results that generalized, e.g., non-specialized searches are unlikely to return.

For instance, generalized web searches typically return commonly accessed documents and do so with relatively high relevance rankings for those documents. Moreover, if a standard web search does manage to return a relatively rare document, its rarity will most probably yield it a relatively low relevancy rank. A low relevancy rank is likely to "bury" the document within the search results, where it can be obscured with many other search results. This can essentially force a user to hunt for it within pages of search results, which can be tedious and inefficient.

In an embodiment in which the ranking of a document in the search results is based upon its relative rarity, the ranking returned for a query is a function $f$ of the normalized rank ($R_{normalized}$) with the inverse of the frequency $f_{url}$ of the URL $u_i$, calculated according to Equation 2, below:

$$R_{overall}(u_i,S)=f(R_{normalized}(u_i,S),1/f_{url}(u_i,S)) \quad \text{(Equation 2)}$$

in which the normalized rank ($R_{normalized}$) represents all other calculations that are related to combining the native ranks for the search engines of the set S. In an embodiment, the other calculations associated with a document's rank can include, but are not limited to, handling of duplicate results across search engines, click through rates, and user ratings.

Embodiments are not limited to ranking a document according to its rarity across a set of search engine results. For instance, in an embodiment, the relevancy of a document is measured according to how common that document is across a set of search engine results, which can be a function of a non-inverted frequency associated with a URL. Searches preformed according to such an embodiment may thus return search results that reflect a common opinion, consensus or the like of other searchers, search engine creators, administrators and other participants (e.g., with vertical search).

Results of more specialized searches, such as vertical searches that have been customized by previous users, may be leveraged. This can allow results obtained for searches performed according to such an embodiment to reflect search results that have proven useful or popular, and thus to capitalize on the opinions, lessons and experience of others, integrate useful social factors such as collective knowledge and wisdom, and thus promote efficiency and economy in search engine use.

In an embodiment in which document relevancy is measured according to how common that document occurs in the search results across a set of search engine results, the overall ranking ($R_{overall}$) of a document in the search results returned for a query is a function $f$ of the normalized rank ($R_{normalized}$) with the non-inverted frequency $f_{url}$ of the URL $u_i$, calculated according to Equation 3, below:

$$R_{overall}(u_i,S)=f(R_{normalized}(u_i,S),f_{url}(u_i,S)) \quad \text{(Equation 3)}$$

in which the normalized rank ($R_{normalized}$) represents all other calculations that are related to combining the native ranks for the search engines of the set S. In an embodiment, the other calculations associated with the normalized rank can include, but are not limited to, handling of duplicate results across search engines, click through rates, and user ratings.

Overall ranks for each URL are assigned 503, based in an embodiment on a simple implementation of an overall ranking function such as sorting a list of frequencies.

For instance, results, e.g., URLs, returned for an example query executed against three individual search engines 1, 2 and 3 are ranked (501) as shown in Table 1, below.

TABLE 1

| Search Engine 1 Results | Search Engine 2 Results | Search Engine 3 Results |
|---|---|---|
| A | A | D |
| B | D | F |
| C | E | G |

Frequencies for each URL returned in response to the query are determined (502), calculated for instance with Equation 1, above. A list of example frequencies are shown in Table 2, below.

TABLE 2

| URL | Frequency |
|---|---|
| A | 0.66 |
| B | 0.33 |
| C | 0.33 |
| D | 0.66 |
| E | 0.33 |
| F | 0.33 |
| G | 0.33 |

For assigning (503) overall ranks for each URL, the list of frequencies is sorted. When sorted, the example frequencies shown in Table 2 are ranked as shown in Table 3, below. The rankings may be determined with Equation 2 and/or Equation 3 above, or according to another ranking model.

TABLE 3

| URL | Ranking |
|---|---|
| A | 1 |
| D | 2 |
| B | 3 |
| C | 4 |
| E | 5 |
| F | 6 |
| G | 7 |

These rankings are presentable, e.g., to a user and/or for further processing.

The results returned from the multiple search engines are consolidated 504, using in an embodiment the URL frequencies and/or the search engine ranks. For instance, the frequencies of the URLs returned with each search engine may be summed, as shown in Table 4, below.

TABLE 4

Search Engine 1 Results: 0.66 + 0.33 + 0.33 = 1.33
Search Engine 2 Results: 0.66 + 0.66 + 0.33 = 1.66
Search Engine 3 Results: 0.66 + 0.33 + 0.33 = 1.33

Search engine results may then be ranked according to their summed URL frequencies. Ranking according to the example results shown in Table 4, Search Engine 2 results are ranked first, Search Engine 1 results second and Search Engine 3 results third (e.g., one or more other criteria may be used to distinguish between tied results). Thus, where presented according to the group format (e.g., group presentation format 312; FIG. 3A), the example results are shown in Table 5, below.

TABLE 5

| Search Engine Results 2 |
|---|
| A |
| D |
| E |
| Search Engine Results 1 |
| A |
| B |
| C |
| Search Engine Results 3 |
| D |
| F |
| G |

EQUIVALENTS, EXTENSIONS, ALTERNATIVES & MISCELLANEOUS

Thus, example embodiments relating to a readable physical standby database system are described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising steps of:
   generating a generated query based at least in part on a certain search query;
   submitting the generated query to a particular search engine;
   in response to submitting the generated query to the particular search engine, receiving from the particular search engine results indicating a first plurality of search engines;
   selecting a second plurality of search engines from the first plurality of search engines;
   to obtain search results for said certain search query, submitting one or more search queries to said second plurality of search engines;
   for each search engine of said second plurality of search engines, receiving certain search results for said one or more search queries submitted to said each search engine; and
   consolidating said certain search results, which are received from each search engine of said second plurality of search engines, to produce a consolidated set of search results;
   presenting said consolidated set of search results to a user, wherein particular search results of the consolidated set of search results are visually grouped into search result groups based on the search engine from which each of said particular search results was received;
   wherein the steps are performed by one or more computing devices.

2. The method as recited in claim 1 wherein said results indicating the first plurality of search engines are based at least in part on information describing each search engine of said first plurality of search engines.

3. The method as recited in claim 1 wherein said submitting one or more search queries to said second plurality of search engines further comprises:
   generating a particular query based at least in part on said certain search query; and
   submitting said particular query to at least one search engine of said second plurality of search engines.

4. The method as recited in claim 1 wherein one or more of said second plurality of search engines comprise a web site.

5. The method as recited in claim 1 wherein selecting said second plurality of search engines comprises selecting a search engine index.

6. The method as recited in claim 1 wherein said consolidating comprises combining results returned from each search engine of said selected second plurality of search engines into a single set of search results for presentation to an end user submitting said certain search query.

7. The method as recited in claim 6 wherein said single set of search results is ranked according to relevance.

8. The method as recited in claim 6 wherein one or more results of said single set of search results are grouped according to which search engine of said second plurality of search engines returned said one or more results.

9. A computer-readable volatile or non-volatile medium storing one or more sequences of instructions which, when executed by one or more processors, causes the one or more processors to perform the method recited in claim 1.

10. A computer-readable volatile or non-volatile medium storing one or more sequences of instructions which, when executed by one or more processors, causes the one or more processors to perform the method recited in claim 2.

11. A computer-readable volatile or non-volatile medium storing one or more sequences of instructions which, when executed by one or more processors, causes the one or more processors to perform the method recited in claim 3.

12. A computer-readable volatile or non-volatile medium storing one or more sequences of instructions which, when executed by one or more processors, causes the one or more processors to perform the method recited in claim 4.

13. A computer-readable volatile or non-volatile medium storing one or more sequences of instructions which, when executed by one or more processors, causes the one or more processors to perform the method recited in claim 5.

14. A computer-readable volatile or non-volatile medium storing one or more sequences of instructions which, when executed by one or more processors, causes the one or more processors to perform the method recited in claim 6.

15. A computer-readable volatile or non-volatile medium storing one or more sequences of instructions which, when executed by one or more processors, causes the one or more processors to perform the method recited in claim 7.

16. A computer-readable volatile or non-volatile medium storing one or more sequences of instructions which, when executed by one or more processors, causes the one or more processors to perform the method recited in claim 8.

17. A system, comprising:
   a computer system, comprising one or more computing devices, configured to:
   generate a generated query based at least in part on a certain search query;
   submit the generated query to a particular search engine;
   in response to submitting the generated query to the particular search engine, receive from the particular search engine results indicating a first plurality of search engines;
   select a second plurality of search engines from the first plurality of search engines;
   to obtain search results for said certain search query, submit one or more search queries to said second plurality of search engines;
   for each search engine of said second plurality of search engines, receive certain search results for said one or more search queries submitted to said each search engine; and
   consolidate said certain search results, which are received from each search engine of said second plurality of search engines, to produce a consolidated set of search results;
   present said consolidated set of search results to a user, wherein particular search results of the consolidated set of search results are visually grouped into search result groups based on the search engine from which each of said particular search results was received.

18. The method as recited in claim 1 wherein said consolidating said certain search results is based at least in part on preferences of an end user submitting said certain search query.

19. The method as recited in claim 1
wherein said selecting said second plurality of search engines from said first plurality of search engines is based at least in part on ranks for each search engine of the first plurality of search engines; and
wherein said second plurality of search engines include the most relevant search engines from said first plurality of search engines;
wherein the most relevant search engines are determined based on the ranks of the first plurality of search engines.

20. The method as recited in claim 1, wherein said consolidating comprises combining results returned from said selected second plurality of search engines into a plurality of sets of search results corresponding to each search engine of said second plurality of search engines for presentation to an end user submitting said certain search query.

21. The method as recited in claim 1 further comprising:
determining a rank for each search engine of the second plurality of search engines;
wherein presenting said consolidated set of search results further comprises ordering said search result groups based on said rank for each search engine of the second plurality of search engines.

22. The method as recited in claim 1 further comprising:
presenting to the user a list of said second plurality of search engines;
wherein the list of said second plurality of search engines is visually independent from the consolidated set of search results.

23. The method as recited in claim 1, wherein the consolidated set of search results includes a reference to a referenced search engine of the second plurality of search engines, further comprising:
receiving a selection, from the user, of the referenced search engine; and
in response to receiving said selection of the referenced search engine, displaying search results from the referenced search engine.

* * * * *